Sept. 27, 1966  R. J. CHARLES  3,275,470
GLASS BODIES AND METHODS OF TREATMENT THEREOF
Filed Feb. 18, 1963
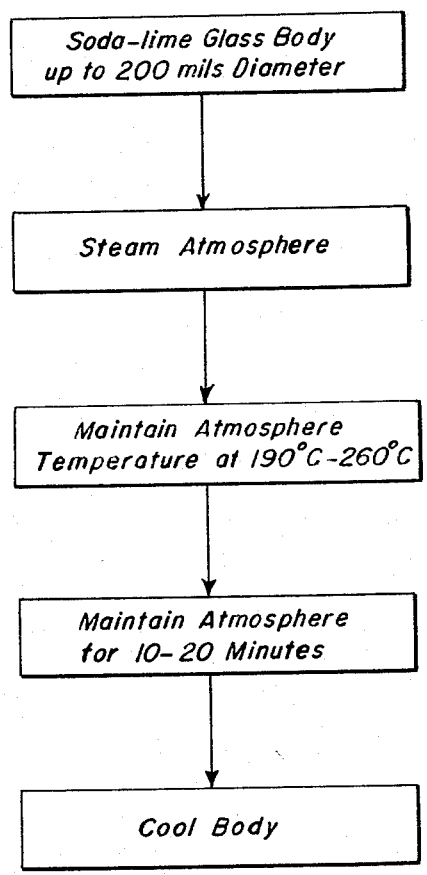
Inventor:
Richard J. Charles,
by Paul R. Webb, II
His Attorney.

United States Patent Office 3,275,470
Patented Sept. 27, 1966

---

3,275,470
GLASS BODIES AND METHODS OF TREATMENT THEREOF
Richard J. Charles, Schenectady, N.Y., assignor to General Electric Company, a corporation of New York
Filed Feb. 18, 1963, Ser. No. 259,793
3 Claims. (Cl. 117—106)

This application is a continuation-in-part of my co-pending application filed August 17, 1960, as Serial Number 50,082, now abandoned, and assigned to the same assignee as the present application.

This invention relates to soda-lime glass bodies and to methods of treatment thereof and more particularly to improved soda-lime glass bodies having an initial diameter of up to 200 mils in thickness and methods of treatment to increase the transverse rupture strength of such bodies.

Previously, soda-lime glass bodies including rods and tubing have been immersed briefly in a commercial 60 percent hydrofluoric acid bath to etch away surface damage. While such treatment has improved the strength of these bodies, subsequent surface damage occurs during normal usage. The initial hydrofluoric acid bath will not afford protection to the glass body against further surface damage. Thus, it is desirable to provide an improved glass body which is not subject to additional surface injury during handling.

Glass bodies which have a diameter of up to 200 mils in thickness are useful for miniature support rods and tubing. If such bodies are treated with hydrofluoric acid, the transverse rupture strength is improved substantially over an untreated body. However, if these bodies are subjected to abrasion or other surface damage during normal use, the initial strength improvement does not provide protection against rupture. It would, therefore, be desirable to provide an improved glass body having an initial diameter of up to 200 mils in thickness and methods for treating initially untreated glass bodies whereby strength characteristics are imparted thereto and are retained for a prolonged period of time.

It is an object of my invention to provide glass bodies having an initial diameter of up to 200 mils in thickness with improved transverse rupture strength.

It is another object of my invention to provide a method of treatment for improving the transverse rupture strength of glass bodies having a diameter of up to 200 mils in thickness.

It is another object of my invention to provide a corrosion product layer on the surface of glass bodies having a diameter of up to 200 mils in thickness to prevent rupture.

It is a further object of my invention to provide a method for treating glass bodies having an initial diameter of up to 200 mils in thickness to form a protective corrosion product layer on the surface of such bodies.

In carrying out my invention in one form, a method of treating a soda-lime glass body having an initial diameter of up to 200 mils in thickness consists in providing an atmosphere containing 80 percent to 100 percent saturated steam, maintaining the atmosphere in a temperature range of about 190° C. to 260° C., subjecting the body to the atmosphere for a period of about 10 to 20 minutes whereby a corrosion product layer of 2 to 5 mils thickness is formed on the surface of the body, and cooling the body.

The terminology "80 percent to 100 percent saturated" is another way of describing a steam environment wherein the number of molecules of $H_2O$ present at any given temperature is in the range of between 80 percent and 100 percent of the number of $H_2O$ molecules present, when such temperature and pressure conditions prevail as exist, for example, along the saturation line on the Mollier diagram. Thus, by way of example, with steam at 80 percent saturated conditions at some selected temperature, the pressure prevailing is 80 percent of the pressure of 100 percent saturated steam at the selected temperature. This infers, of course, that such steam is in the "dry" superheated condition, because liquid water could not be present at any percent saturation below 100 percent.

Reference to the steam tables on pages 2260–63 of the Handbook of Chemistry and Physics (38th Edition, Copyright 1956—Chemical Rubber Publishing Co.) establishes the pressures corresponding to the aforementioned conditions. Thus, at 100 percent saturation the pressure at 190° C. is 182 p.s.i. (pounds per square inch absolute) and the pressure at 260° C. is 681 p.s.i. Under 80 percent saturation conditions the pressures are 80 percent of the aforementioned values. Thus, at 190° C. the pressure would be 146 p.s.i. and at 260° C. the pressure would be 545 p.s.i. Therefore, having set both the percent saturation and the temperature, the third parameter, the pressure, is also fixed.

These and various other objects, features and advantages of the invention will be better understood from the following description taken in connection with the accompanying drawing in which:

The single figure of the drawing is a diagrammatic flow sheet of applicant's method.

Glass bodies having an initial diameter of up to 200 mils in thickness disclose a transverse rupture strength of between 5000 and 8000 pounds per square inch. When such bodies in the form of rods or tubes are immersed briefly in a hydrofluoric acid bath, the strength characteristics are improved up to the order of 100,000 pounds per square inch. Such improvement is thought to be a consequence of the etching away of surface damage by the acid. However, the hydrofluoric acid treatment does not protect the glass body against subsequent surface damage during normal handling.

I discovered unexpectedly that glass bodies having an initial diameter of up to 200 mils in thickness would have their transverse rupture strength increased to 20,000 to 25,000 pounds per square inch after treatment in an atmosphere containing 8 percent to 100 percent saturated steam which strength was not diminished during subsequent usage. This strength characteristic is attributed to a corrosion protection product layer of 2 to 5 mils in thickness which forms on the surface of the glass body preventing subsequent surface injury during handling. Unlike the hydrofluoric acid treatment, the initial surface damage to the glass body is not removed, but a relatively stable and tenacious protective layer is formed instead. It appears that the delayed failure sensitivity of the glass treated in a steam atmosphere is less than that of untreated glass.

Furthermore, the temperature of this atmosphere containing 80 percent to 100 percent saturated steam should be maintained in a range of about 190° C. to 260° C. while treatment time is from about 10 to 20 minutes. After the glass bodies have been treated in such a steam atmosphere, they are removed and allowed to cool. It is, of course, possible to cool the body in the container or enclosure for the steam atmosphere by shutting off the steam source.

The single figure of the drawing discloses applicant's method in a diagrammatic flow sheet. A soda-lime glass body which has an initial diameter of up to 200 mils in thickness is subjected to an atmosphere containing 80 percent to 100 percent saturated steam which atmosphere is maintained in a temperature range of about 190° C. to 260° C. The body is subjected to this atmosphere for a period of about 10 to 20 minutes whereby a corrosion product layer is formed on the surface of the body. The body is then allowed to cool.

In the practice of the treatment of soda-lime glass bodies of the present invention, an atmosphere containing 80 percent to 100 percent saturated steam and maintained in a temperature range of about 190° C. to 260° C. is admitted to a container or enclosure (not shown) of any conventional type. The glass bodies in the form of rods or tubes or combinations thereof are placed in any suitable manner within the container to which the steam is subsequently admitted for purposes of subjecting the bodies to the steam atmosphere. I have found that the glass bodies should be maintained in the steam atmosphere for a period of about 10 to 20 minutes to form a corrosion product layer of 2 to 5 mils thickness on the surface of the bodies. After treatment in the steam atmosphere, the bodies may be removed from the container to provide cooling or the source of steam may be discontinued to the container. It is, of course, obvious that removal of the bodies outside the container will provide cooling to room temperature at a much more rapid rate.

As an example, a soda-lime glass rod having an initial diameter of 100 mils was subjected to an atmosphere containing 100 percent saturated steam and maintained at a temperature of 240° C. for a period of about 15 minutes whereby a corrosion product layer of 5 mils in the thickness was formed on the surface of the rod. The rod showed a subsequent transverse rupture strength of 25,000 pounds per square inch. A similar rod which was not treated showed a strength of between 5000 and 8000 pounds per square inch. The above-treated rod was relatively stable since it was stored in a normal room atmosphere for five months prior to the transverse rupture strength test. The corrosion product layer formed on the surface of the glass body resulted in a slight milkiness on the surface which is identifiable by the naked eye and was measured as to thickness under a microscope.

While other modifications of this invention and variations of method which may be employed within the scope of the invention have not been described, the invention is intended to include such that may be embraced within the following claims.

What I claim as new and desire to secure by Letters Patent of the United States is:

1. A method for substantially increasing the strength of a solid soda-lime glass body having an initial diameter of up to 200 mils in thickness which consists in providing an atmosphere containing 80 percent to 100 percent saturated steam, maintaining said atmosphere in a temperature range of about 190° to 260° C., subjecting said body to said atmosphere for a period of about 10 to 20 minutes whereby a corrosion product layer is formed on the surface of said body, and cooling said body.

2. A method for substantially increasing the strength of a solid soda-lime glass body having an initial diameter of 100 mils in thickness which consists in providing an atmosphere containing 100 percent saturated steam, maintaining said atmosphere at a temperature of 240° C., subjecting said body to said atmosphere for a period of about 15 minutes whereby a corrosion product layer of 5 mils in thickness is formed on the surface of said body, and cooling said body.

3. A solid soda-lime glass body having a corrosion product layer over the surface thereof at least 2 mils in thickness, said corrosion product layer being formed in situ by exposing the surface of said body to a steam atmosphere for a period of at least about 10 minutes, said steam atmosphere being between 80 percent and 100 percent of saturation and being maintained at a temperature in the range of from about 190° C. to about 260° C. after which said body is cooled.

References Cited by the Examiner

UNITED STATES PATENTS

| | | | |
|---|---|---|---|
| 2,273,778 | 2/1942 | Berthold | 65—111 X |
| 2,751,962 | 6/1956 | Drummond | 65—3 |
| 3,021,563 | 2/1962 | Slayter et al. | 65—3 |
| 3,065,103 | 11/1962 | Marzocchi | 117—54 |
| 3,215,515 | 11/1965 | Bacon | 65—30 |

ALFRED L. LEAVITT, *Primary Examiner.*

MURRAY KATZ, *Examiner.*

J. R. BATTEN, JR., *Assistant Examiner.*